(12) United States Patent
Hartnagel

(10) Patent No.: US 12,719,338 B2
(45) Date of Patent: Aug. 25, 2026

(54) METHOD FOR MEASURING THE ROTOR ANGLE-BASED EXPANSION OF A ROTATING ROTOR UNDER CENTRIFUGAL STRESS

(71) Applicant: Schenck RoTec GmbH, Darmstadt (DE)

(72) Inventor: Matthias Hartnagel, Alsbach-Haehnlein (DE)

(73) Assignee: Schenck RoTec GmbH, Darmstadt (DE)

( * ) Notice: Subject to any disclaimer, the term of this patent is extended or adjusted under 35 U.S.C. 154(b) by 198 days.

(21) Appl. No.: 18/577,389

(22) PCT Filed: Jul. 6, 2022

(86) PCT No.: PCT/DE2022/100482
§ 371 (c)(1),
(2) Date: Jan. 8, 2024

(87) PCT Pub. No.: WO2023/284913
PCT Pub. Date: Jan. 19, 2023

(65) Prior Publication Data

US 2024/0322653 A1 Sep. 26, 2024

(30) Foreign Application Priority Data

Jul. 13, 2021 (DE) ..................... 10 2021 118 105.4

(51) Int. Cl.
*H02K 11/21* (2016.01)
*G01B 21/32* (2006.01)

(52) U.S. Cl.
CPC ............. *H02K 11/21* (2016.01); *G01B 21/32* (2013.01)

(58) Field of Classification Search
CPC ......... G01B 21/32; H02K 11/21; G01M 1/00; F16F 15/322
See application file for complete search history.

(56) References Cited

U.S. PATENT DOCUMENTS 10,823,632 B2 11/2020 Trukenmueller

FOREIGN PATENT DOCUMENTS

DE 101 44 643 A1 6/2003
DE 102013110632 A1 * 3/2015 ............. G01B 21/32

(Continued)

OTHER PUBLICATIONS

International Search Report in PCT/DE2022/100482, mailed Oct. 14, 2022.

(Continued)

*Primary Examiner* — Said Bouziane
(74) *Attorney, Agent, or Firm* — Collard & Roe, P.C.

(57) ABSTRACT

In a method for measuring the expansion of a rotating rotor on the basis of the rotor rotational speed, a first distance sensor is arranged at a distance to the rotor surface, the distance sensor contactlessly detecting the distance between the rotor surface and the first distance sensor in a time-based manner and generating first time-based electric distance signals. A zero mark sensor scans zero marks applied onto the rotor in a time-based manner. A second distance sensor is arranged on a reference surface which is remote from the first distance sensor in the axial direction of the rotor and from which the expansion and surface profile are identified. In order to eliminate disturbance variables, the signals detected by the second distance sensor can be calculated together with those of the first distance sensor.

6 Claims, 2 Drawing Sheets

(56) References Cited

FOREIGN PATENT DOCUMENTS

Figure 1:
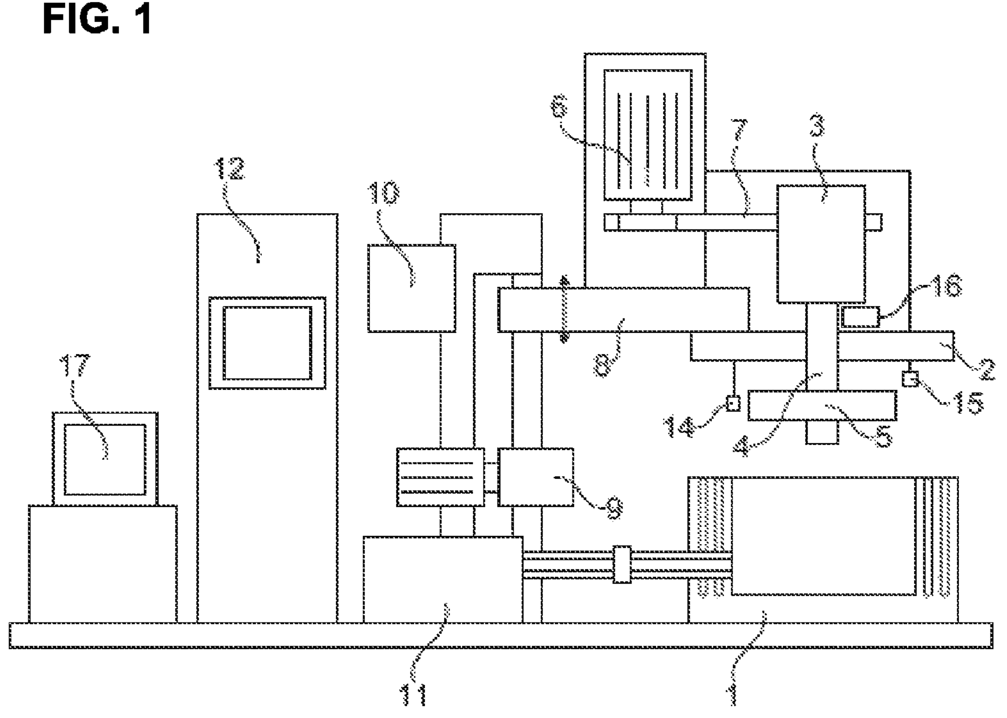

| | | | |
|---|---|---|---|
| DE | 10 2013 110 632 | B4 | 9/2016 |
| DE | 10 2018 102 751 | B3 | 2/2019 |
| JP | H11-230733 | A | 8/1999 |
| KR | 10-0838033 | B1 | 6/2008 |

OTHER PUBLICATIONS

T. Tiainen et al., "Analysis of total rotor runout components with multi-probe roundness measurement method", Measurement, vol. 179, Apr. 17, 2021, XP086617433, DOI: 10.1016/J.MEASUREMENT.2021.109422, ISSN:0263-2241.

Excerpt from the article P. Günther et al., "Measurement of radial expansion and tumbling motion of a high-speed rotor using an optical sensor system", Mechanical Systems and Signal Processing, vol. 25, Issue 1, Jan. 2011, pp. 319-330.

* cited by examiner

METHOD FOR MEASURING THE ROTOR ANGLE-BASED EXPANSION OF A ROTATING ROTOR UNDER CENTRIFUGAL STRESS

CROSS REFERENCE TO RELATED APPLICATIONS

This application is the National Stage of PCT/DE2022/100482 filed on Jul. 6, 2022, which claims priority under 35 U.S.C. § 119 of German Application No. 10 2021 118 105.4 filed on Jul. 13, 2021, the disclosure of which is incorporated by reference. The international application under PCT article 21 (2) was not published in English.

The invention relates to a method for measuring the rotor angle-based expansion of a rotating rotor under centrifugal stress with only one sensor, wherein another sensor is provided for measuring the expansion of a reference surface of which the expansion and the surface profile are known and which is used to determine disturbance variables.

Rotors are subject to a centrifugal force load and are widened thereby, i.e. the diameter of the rotors increases. In the simplest case, the expansion increases quadratically with the rotational speed. If one wants to precisely know the extent of the expansion which a rotor experiences during its intended use in order to be able to take it into account, the expansion must be measured during the rotation of the rotor. Previously applied methods for ascertaining the expansion of rotors have only provided results with regard to the change in diameter of rotors. In some cases, however, the expansion of a single rotor segment is also of interest.

During the rotation of a rotor, rotor vibrations can arise which are contained in the distance signal generated by the distance sensor. These can be vibrations of the first order caused by imbalance or impact. Furthermore, vibrations can occur due to influences of the rotor bearing, for example by sliding bearings, the frequency of which is smaller or greater than that of first-order vibrations. In addition, the center of the rotor about which the rotor vibrates can shift at different speeds. The rotor is normally mounted with a vertical axis of rotation in a sliding bearing and can therefore move laterally and assume different stable points at different rotational speeds. The noted influences and in particular the rotational speed-dependent shifting of the rotor shaft are known as disturbance variables or disturbing vibrations and superimpose themselves on the measured distance signal, and thereby influence the accuracy of the measurement result.

From Günther, P. et al.: Measurement of radial expansion and tumbling motion of a high-speed rotor using an optical sensor system. Mechanical Systems and Signal Processing, Vol. 25 (2011), pp. 319 to 330, a method is known for measuring the radial expansion and tumbling movement of a rotor rotating at high speed with the aid of an optical sensor system. The sensor system comprises three laser Doppler distance sensors which are arranged at the same height and in angular positions along the circumference of the rotor, and have a distance from the rotor and an angular distance of 120° from one another. In order to determine the exact angular alignment of the three distance sensors, an optical mark, which triggers sensor signals, is attached to the rotor, wherein the time delay between the triggered signals of the three sensors is used in relation to the rotational frequency to determine the precise angular distance of the sensors. During the measurement, the electrical output signals of the sensors are sampled with a sampling rate adapted to the rotor rotational speed and, depending on the rotational frequency, set so that a certain number of measurement points are reached during a rotor revolution. For each sampling step, the mass center and the radial expansion are then calculated by solving a linear equation system, and finally an average value of the radial expansion for a rotor assumed to be a cylindrical measurement object is calculated from a greater number of successive measurement points. In so doing, the rotor expansion is not determined in relation to the angle of rotation.

DE 101 44 643 A1 describes a measuring system having a plurality of distance sensors which are connected to a stator of a rotor-stator system, are arranged on a rotor and measure free of contact and in which two pairs of diametrically opposite distance sensors are arranged for detecting a radial distance between the stator and the rotor. To determine a displacement of the rotor, the measurement signals of the distance sensors of a pair with opposite signs are added. To determine a radial expansion of the rotor, the measurement signals of all four distance sensors with positive signs are added. Means for the rotation angle-related detection of a rotor expansion are not provided.

DE 102013 110 632 B4 discloses methods for measuring the expansion of a rotor by means of two distance sensors whose distance signals are elaborately offset against each other.

The invention is therefore based on the object of presenting a method for measuring the expansion of a rotating rotor as a function of the rotor rotational speed in which arising interference variables can be easily eliminated.

The object is achieved by the features of claim 1 and claim 5. Preferred embodiments are presented in the dependent claims.

According to the invention, the object is achieved in that a method for measuring the expansion of a rotating rotor on the basis of the rotor rotational speed is provided, in which a first distance sensor is arranged at a basic distance from the rotor surface, said distance sensor contactlessly detects the distance between the rotor surface and the first distance sensor in a time-based manner and generates first time-based electric distance signals, a zero mark sensor is assigned to the rotor that scans zero marks applied onto the rotor and generates time-based electrical zero mark signals, wherein the time-based first distance signals and the time-based zero mark signals are fed to an electrical evaluation device and processed thereby by calculating a rotational speed and a rotational angle assigned to each instant of a rotor rotation from the zero mark signals, and each rotational angle assigned to an instant is combined with the simultaneous distance signal into a rotational angle-related distance signal, and an expansion of the rotor dependent on the rotational angle and the rotational speed is calculated therefrom, wherein a second distance sensor is arranged at a basic distance from the reference surface on a first reference surface which is remote from the first distance sensor in the axial direction of the rotor and of which the expansion and surface profile are known, said second distance sensor contactlessly detecting the distance of the reference surface from the second distance sensor in a time-based manner and generating time-based electrical second distance signals which are supplied to the electrical evaluation device, and wherein a third distance sensor is arranged at a basic distance from the second reference surface on another second reference surface which is remote from the first and second distance sensors in the axial direction of the rotor and of which the expansion and surface profile are known, which third distance sensor detects the distance between the second reference surface and the third distance sensor in a time-based manner without contact and generates time-based electrical third distance signals that are supplied to the electrical evaluation device which processes the second and third distance signals to correct the first distance signals detected by the first distance sensor in that, after subtracting the known expansion and surface profiles of the surface from the second and third distance signals, the interference oscillations remaining therein are geometrically removed proportionally from the first distance signal of the first distance sensor by means of trigonometry.

According to the invention, the object is also achieved in that a method for measuring the expansion of a rotating rotor on the basis of the rotor rotational speed is provided, in which a first distance sensor is arranged at a basic distance from the rotor surface, said distance sensor contactlessly detects the distance between the rotor surface and the first distance sensor in a time-based manner and generates first time-based electric distance signals, a zero mark sensor is assigned to the rotor that scans zero marks applied onto the rotor and generates time-based electrical zero mark signals, wherein the time-based first distance signals and the time-based zero mark signals are fed to an electrical evaluation device and processed thereby by calculating a rotational speed and a rotational angle assigned to each instant of a rotor rotation from the zero mark signals, and each rotational angle assigned to an instant is combined with the simultaneous distance signal into a rotational angle-related distance signal, and an expansion of the rotor dependent on the rotational angle and the rotational speed is calculated therefrom, wherein a second distance sensor is arranged at a basic distance from the rotor surface at a rotor surface which is remote from the first distance sensor in the axial direction of the rotor and of which the expansion and surface profile are known, the second distance sensor contactlessly detecting the distance of the reference surface from the second distance sensor in a time-related manner and generating time-related electrical second distance signals which are fed to the electrical evaluation device and processed thereby to correct the first distance signals detected by the first distance sensor in that, after subtracting the known expansion and profile of the surface from the second distance signal, the interfering oscillations remaining therein are geometrically removed proportionally from the first distance signal of the first distance sensor by means of trigonometry and a known pivot point of the rotor.

It can be provided that a third distance sensor is arranged at a basic distance from the first reference surface which contactlessly detects the distance of the surface from the third distance sensor in a time-related manner and generates time-related electrical third distance signals which are fed to the electrical evaluation device, and an inclination or tilting of the rotor is eliminated as a disturbance variable by offsetting the second distance signals and the third distance signals, and the disturbance oscillations remaining in the second distance signal from the first distance signal of the first distance sensor are removed from the second distance signal. As a result, a tilting of the rotor can be taken into account in that it is geometrically determined as an interference variable and is eliminated with a correct weighting from the expansion signal of the rotor.

The invention makes it possible to determine the expansion of a rotor caused by centrifugal forces and dependent on the rotational speed for each point of the track of the rotor surface recorded by the measurement, determined by a rotation angle related to a zero point, taking into account any disturbance variables.

Since the measurement of the expansion is also carried out on the reference surface of which the expansion is known, the disturbance variables can be determined in a simple manner simultaneously with the actual distance measurement and subtracted from the distance measurements on the rotor. A simple measurement with only a few sensors is thereby possible, which can be carried out quickly. In the known measuring methods, two sensors have to be used per rotor measuring track. In contrast, in the method according to the invention, one sensor per measuring track is sufficient. For the purposes of the invention, the reference surface can be a component, part or region of the rotor.

The reference surface can also be a component, part or region of a component which can be connected to the rotor and of which the expansion is known, and which can be screwed onto the rotor, for example, or can be fastened in another manner. This can be a reference component having at least one reference surface such as a reference pin. The expansion of the reference surface can also be determined in advance in a separate measurement or can be negligibly small due to the nature of the surface.

If the isotropy of the bearing is not given, it can advantageously be provided that at least one additional, in particular fourth and fifth distance sensor is provided which is arranged at a basic distance from one of the reference surfaces and contactlessly detects the distance of the surface from the fourth distance sensor in a time-related manner and generates time-related electrical fourth distance signals which are fed to the electrical evaluation device, wherein the fourth distance sensor together with another of the distance sensors arranged on the reference surface are arranged at a different angle in the circumferential direction to the second and third sensors already introduced (preferably 90° or less). This allows the effect to be correspondingly taken into account.

Figure 2:
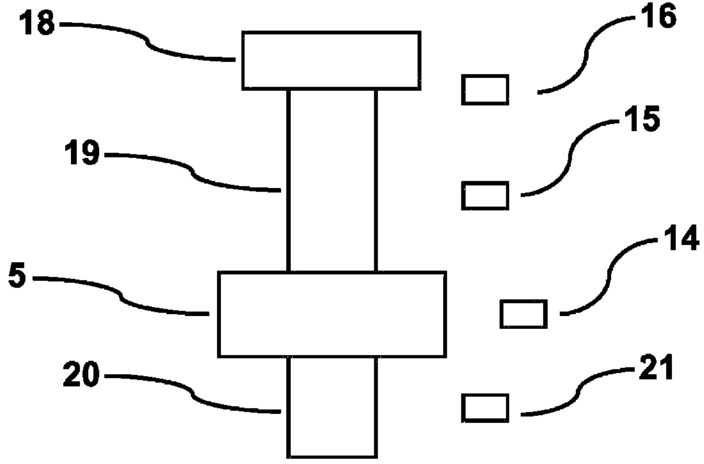
Figure 3:
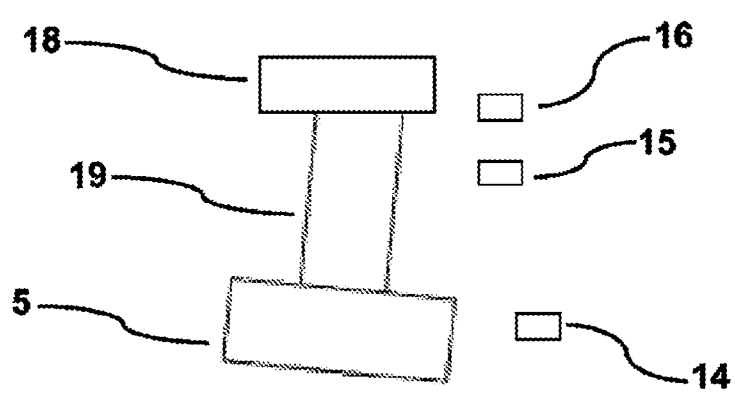

The invention is explained in more detail below with reference to embodiments which are illustrated in the drawings. In the drawings:

FIG. 1 shows a schematic representation of a device for measuring the expansion of a rotating rotor, FIG. 2 shows a schematic measurement setup with two reference surfaces, and FIG. 3 shows a schematic measurement setup with one reference surface.

FIG. 1 shows an exemplary device for high-speed spinning and for measuring the expansion of rotating rotors which schematically illustrates one possible application of an embodiment of the invention. The device comprises a cylindrical protective container 1 which receives and surrounds the rotating rotor during a measuring run. The protective container 1 can be closed with a cover 2, on the upper side of which, located outside the protective container 1, a gearbox 3 with a shaft 4 is arranged. The shaft 4 is guided through the cover 2 and has a flange on the underside of the cover 2 for fastening a rotor 5 to be measured. The shaft 4 is driven by an electric motor 6 which is connected to the gearbox 3 by a belt drive 7. The cover 2 is attached to an arm 8 of a hydraulic lifting unit 9, by means of which the lid 2 can be lifted from the protective container 1 and placed thereon. The hydraulic control of the lifting unit 9 is accommodated in a housing 10 which is arranged on the frame of the lifting unit 9. The closed protective container 1 can be evacuated by means of a vacuum pump 11 in order to avoid drive losses and excessive heating of the container interior. An electrical control unit 12 serves to control the electric motor 6, the lifting unit 9 and the vacuum pump 11.

For measuring the expansion of the rotor 5, a contactlessly measuring a distance sensor 14 can be attached to the cover 2 at a short distance from the rotor surface. Another distance sensor 15 can be arranged at a distance from a schematically indicated component with a reference surface, in this case a pin. The arrangement is also schematically shown in FIG. 3.

Furthermore, a zero-point sensor 16, which scans a zero mark on the shaft 4, is arranged on the cover 2 next to an exposed portion of the shaft 4. The scanning of the zero mark also applies to the rotor 5, since the rotor 5 is fixedly connected to the shaft 4 with the aid of the flange. The distance sensors 14, 15 and the zero point sensor 16 are connected by lines (not shown) to an evaluation device 17 which includes a computer programmed with an evaluation program. The distance sensors 14, 15 generate analog voltages which are converted into digital distance signals in the input of the evaluation device 17. The voltage signal of the zero point sensor 16 is also digitized.

To measure the expansion of the rotor 5, the cover 2 is placed onto the protective container 1 by the lifting unit 9. The rotor 5 and the distance sensors 14, 15 thereby enter in the interior of the protective container 1 so that measuring runs can now be carried out by the control unit 12. In the measuring runs, the rotor 5 is driven by the electric motor 6 via the gearbox 3 and the shaft 4 and rotated at different rotational speeds.

In one embodiment, a plurality of reference runs can be carried out at low speeds at the start of a measurement, which serve to determine the basic distance between the two distance sensors 14, 15. To measure the expansion, the rotor 5 is then accelerated to a very much higher rotational speed. At a constant rotational speed, the distance signals of the two distance sensors 14, 15 and the zero-mark signal of the zero-mark sensor 16 are detected simultaneously and supplied to the evaluation device 17 and processed by this in a time-based manner. An essential advantage of the invention is that the measurement can also take place during startup, which in turn is associated with saving time.

The evaluation device 17 uses the zero mark signals to calculate the rotation angle reference of the distance signals and can—for the embodiment in which measurement occurs at a constant speed—calculate an average value from the distance signals measured over several rotor revolutions. In the event of measuring during startup, the expansion can be output relative to the angle over the rotational speed.

The evaluation device 17 now has angle-related, in particular averaged, distance signals from each of the two distance sensors 14, 15. The distance signals of the distance sensor 14 contain the measured distance related to the angle of rotation and dependent on the expansion of the rotor 5, which is dependent on the speed of rotation and also on the angle of rotation. The distance signals also contain the rotational speed-independent basic distance and further disturbance variables. The same applies to the distance signals determined by the distance sensor 15. To calculate the expansion, the distance signals of the reference surfaces are subtracted from the distance signals of the rotor measuring tracks, wherein a proportional subtraction can be dependent on the geometric ratios of the position of the measuring tracks, which in turn can be determined by using trigonometric methods. As a result, the interfering signals which also occur on the reference surfaces are eliminated.

FIG. 2 shows a schematic measurement setup with two reference surfaces, and FIG. 3 shows a schematic measurement setup with a reference component in the form of a reference pin. As already explained by way of example above, the rotor 5 is connected to a drive shaft via a flange 18. A region can be present between the rotor 5 and the flange 18, which region is referred to according to the invention as a reference surface or reference area, and of which the expansion under centrifugal stress and the surface profile are known. This can also be a separate reference component which can be connected to the rotor 5, such as for example a reference pin 19 with a reference surface or a plurality of reference surfaces which is screwed to the rotor 5. Depending on the design of the rotor 5 or fastening of the rotor 5 in a measuring device, the rotor 5 can be arranged more or less enclosed between two reference pins 19, 20. In contrast, only one reference pin 19 is shown in FIG. 3.

A zero-point sensor 16 is provided for detecting a zero mark, e.g. on the flange 18. Furthermore, a distance sensor 14, which detects the distance signal without contact, is arranged at a distance from the rotor. Furthermore, a second distance sensor 15 can be provided for detecting the distance signal between reference pin 19 and sensor. In the shown embodiment, a third distance sensor 21 is arranged at a distance from the second reference pin 20.

In the embodiment shown in a highly simplified manner in FIG. 3, only a second distance sensor 15 is provided in addition to the first distance sensor 14 and a reference component 19 having at least one reference surface. In this case, after subtracting the known expansion and profile of the surface from the second distance signal detected by the second distance sensor 15, the disturbing oscillations remaining therein can be geometrically removed from the first distance signal of the first distance sensor 14 using trigonometry and a known pivot point of the rotor 5. A tilting or inclination of the rotor 5 can thereby also be taken into account.

The tilting can also be taken into account by eliminating it as a disturbance variable by offsetting the second distance signals and the third distance signals and removing from the second distance signal the disturbance oscillations remaining in the second distance signal from the first distance signal of the first distance sensor 14.

In other words, the method according to the invention enables the elimination of the interference components arising during the measurement of the rotor angle-related expansion of a rotating rotor under centrifugal stress using only one sensor (given a known pivot point) or at least two further sensors which detect the distance signals on a reference surface or a plurality of reference surfaces with a known geometry and expansion over rotational speed and offset them by the distance signals from a rotor detected by a distance sensor. The design of the measuring setup is simple, and the interference components can be easily eliminated since only one sensor is required per measuring level, and one or two additional sensors are required for recording the disturbance variables. Furthermore, because of the method according to the invention, a transient measurement of the expansions during startup is also possible.

In order to further decrease the reduction of the interference influences or improve the accuracy of trigonometry, additional distance sensors can be provided on other reference surfaces. These measurements are taken into account essentially as described above.

Another advantage of the invention is that a 1F feature (e.g., a groove) does not influence the determination of the expansion in a rotor 5 provided that the expansion and the geometry (e.g. perfectly round) of the reference surface over rotational speed are known. In the known methods, however, a complex 1F filtering has to be performed.

The invention claimed is:

1. A method for measuring the expansion of a rotating rotor on the basis of the rotor rotational speed in which a first distance sensor is arranged at a basic distance from the rotor surface and contactlessly detects the distance between the rotor surface and the first distance sensor in a time-based manner, and generates time-based electric first distance signals, a zero mark sensor is assigned to the rotor that scans zero marks applied onto the rotor and generates time-based electrical zero mark signals, wherein the time-based electric first distance signals and the time-based zero mark signals are fed to an electrical evaluation device and processed thereby by calculating a rotational speed and a rotational angle assigned to each instant of a rotor rotation from the zero mark signals, and each rotational angle assigned to an instant is combined with the simultaneous distance signal into a rotational angle-related distance signal, and an expansion of the rotor dependent on the rotational angle and the rotational speed is calculated therefrom, wherein a second distance sensor is arranged at a basic distance from the reference surface on a first reference surface which is remote from the first distance sensor in the axial direction of the rotor and of which the expansion and surface profile are known, said second distance sensor contactlessly detecting the distance of the reference surface from the second distance sensor in a time-based manner and generating time-based electrical second distance signals which are supplied to the electrical evaluation device, wherein a third distance sensor is arranged at a basic distance from the second reference surface on another second reference surface which is remote from the first and second distance sensors in the axial direction of the rotor and of which the expansion and surface profile are known, which third distance sensor detects the distance between the reference surface and the third distance sensor in a time-based manner without contact and generates time-based electrical third distance signals that are supplied to the electrical evaluation device which processes the second and third distance signals to correct the first distance signals detected by the first distance sensor, and wherein, after subtracting the known expansion and profile of the surface from the second and third distance signals, the interference oscillations remaining therein are geometrically removed proportionally from the first distance signal of the first distance sensor by using trigonometric methods.

2. The method according to claim 1, wherein, in addition to the known expansion and profile of the surface, an inclination or a tilting of the rotor is also taken into account by eliminating an interference variable by offsetting the second distance signals and the third distance signals, and the disturbance oscillations remaining in the second distance signal from the first distance signal of the first distance sensor are removed from the second distance signal.

3. The method according to claim 1 wherein a fourth distance sensor is provided which is arranged at a basic distance from one of the reference surfaces and contactlessly detects the distance of the reference surface from the fourth distance sensor in a time-related manner and generates time-related electrical fourth distance signals which are fed to the electrical evaluation device, wherein the fourth distance sensor together with another of the distance sensors arranged on the reference surface are arranged at a different angle to the second and third distance sensors in the circumferential direction.

4. The method according to claim 1, wherein further distance sensors are provided on further reference surfaces.

5. The method according to claim 1, wherein, in order to determine the basic distance of the distance sensors, an average value is formed from a plurality of reference runs at low rotational speed.

6. A method for measuring the expansion of a rotating rotor on the basis of the rotor rotational speed in which a first distance sensor is arranged at a basic distance from the rotor surface and contactlessly detects the distance between the rotor surface and the first distance sensor in a time-based manner, and generates time-based electric first distance signals, a zero mark sensor is assigned to the rotor that scans zero marks applied onto the rotor and generates time-based electrical zero mark signals, wherein the time-based electric first distance signals and the time-based zero mark signals are fed to an electrical evaluation device and processed thereby by calculating a rotational speed and a rotational angle assigned to each instant of a rotor rotation from the zero mark signals, and each rotational angle assigned to an instant is combined with the simultaneous distance signal into a rotational angle-related distance signal, and an expansion of the rotor dependent on the rotational angle and the rotational speed is calculated therefrom, wherein a second distance sensor is arranged at a basic distance from the reference surface at a reference surface remote from the first distance sensor in the axial direction of the rotor and of which the expansion and surface profile are known, the second distance sensor contactlessly detecting the distance of the reference surface from the second distance sensor in a time-related manner and generating time-related electrical second distance signals which are fed to the electrical evaluation device and processed thereby to correct the first distance signals detected by the first distance sensor, and wherein, after subtracting the known expansion and profile of the surface from the second distance signal, the interfering oscillations remaining therein are geometrically removed proportionally from the first distance signal of the first distance sensor by using trigonometric methods and a known pivot point of the rotor.

* * * * *